(12) United States Patent  (10) Patent No.: US 7,982,405 B2
Patchornik  (45) Date of Patent: Jul. 19, 2011

(54) IGNITER CIRCUIT FOR AN HID LAMP

(75) Inventor: Joshua Patchornik, Ramat Gan (IL)

(73) Assignee: Lightech Electronic Industries Ltd., Lod (IL)

( * ) Notice: Subject to any disclaimer, the term of this patent is extended or adjusted under 35 U.S.C. 154(b) by 694 days.

(21) Appl. No.: 11/909,341

(22) PCT Filed: Dec. 6, 2005

(86) PCT No.: PCT/IL2005/001309
§ 371 (c)(1),
(2), (4) Date: Sep. 21, 2007

(87) PCT Pub. No.: WO2006/100661
PCT Pub. Date: Sep. 28, 2006

(65) Prior Publication Data
US 2010/0141164 A1 Jun. 10, 2010

(30) Foreign Application Priority Data

Mar. 22, 2005 (IL) .......................... 167582

(51) Int. Cl.
H05B 41/36 (2006.01)
(52) U.S. Cl. ...................................... 315/224
(58) Field of Classification Search .................. 315/224, 315/209 R, 219, 246, 209 T, 291, 307
See application file for complete search history.

(56) References Cited

U.S. PATENT DOCUMENTS

| 3,636,374 A | 1/1972 | Sumi |
| 3,735,398 A | 5/1973 | Ross |
| 3,760,414 A | 9/1973 | Nicolson |
| 3,903,891 A | 9/1975 | Brayshaw |
| 3,997,814 A | 12/1976 | Toho |
| 4,005,336 A | 1/1977 | Casella |
| 4,007,416 A | 2/1977 | Szatmari |
| 4,076,420 A | 2/1978 | De Maeyer |
| 4,095,140 A | 6/1978 | Kirkhuff |
| 4,253,046 A | 2/1981 | Gerhard |
| 4,266,165 A | 5/1981 | Handler |
| 4,277,728 A | 7/1981 | Stevens |
| 4,289,993 A | 9/1981 | Harper |
| 4,318,031 A | 3/1982 | Lonseth |
| 4,320,326 A | 3/1982 | Banziger |
| 4,323,149 A | 4/1982 | Wyner |
| 4,334,172 A | 6/1982 | Wyner |
| 4,717,863 A | 1/1988 | Zeiler |

(Continued)

FOREIGN PATENT DOCUMENTS

EP  0233605 A2  2/1987

(Continued)

Primary Examiner — Douglas W Owens
Assistant Examiner — Minh D A
(74) Attorney, Agent, or Firm — Browdy and Neimark, PLLC

(57) ABSTRACT

An igniter circuit (10) for an HID lamp (11) has a DC input (VBUS) for coupling to a source of DC voltage, and an output (23, 24) for coupling to the HID lamp. A resonant ignition circuit (12) operating at a controlled resonant frequency is coupled to the DC input for producing successive bursts of voltage having a frequency equal to the resonant frequency and having an amplitude that increases with time. The resonant ignition circuit (12) feeds the bursts of voltage across the output of the igniter until an HID lamp coupled thereto reaches breakdown.

16 Claims, 3 Drawing Sheets

U.S. PATENT DOCUMENTS

| | | |
|---|---|---|
| 4,727,297 A | 2/1988 | Wolze |
| 4,763,044 A | 8/1988 | Nuckolls |
| 4,781,175 A | 11/1988 | McGreevy |
| 4,795,945 A | 1/1989 | Mayer |
| 4,862,039 A | 8/1989 | Kile |
| 4,888,528 A | 12/1989 | Byszewski |
| 4,896,077 A | 1/1990 | Dodd |
| 4,904,903 A | 2/1990 | Pacholok |
| 4,912,374 A | 3/1990 | Nagase |
| 4,920,300 A | 4/1990 | Scott |
| 4,952,845 A | 8/1990 | Veldman |
| 4,958,107 A | 9/1990 | Mattas |
| 4,959,593 A | 9/1990 | Joanins |
| 4,962,336 A | 10/1990 | Dodd |
| 4,983,889 A | 1/1991 | Roberts |
| 4,996,464 A | 2/1991 | Dodd |
| 5,053,681 A | 10/1991 | Budny |
| 5,057,750 A | 10/1991 | Farrall |
| 5,101,142 A | 3/1992 | Chatfield |
| 5,103,140 A | 4/1992 | Cocorna |
| 5,175,476 A | 12/1992 | Anderson |
| 5,192,897 A | 3/1993 | Vossough |
| 5,225,742 A | 7/1993 | Beasley |
| 5,229,927 A | 7/1993 | Vila-Masot |
| 5,319,286 A | 6/1994 | Laytem |
| 5,331,253 A | 7/1994 | Counts |
| 5,365,151 A | 11/1994 | Spiegel |
| 5,365,152 A | 11/1994 | Ozawa |
| 5,396,152 A | 3/1995 | Bognigk |
| 5,424,617 A | 6/1995 | Garbowicz |
| 5,428,268 A | 6/1995 | Melis |
| 5,430,354 A | 7/1995 | Garbowicz |
| 5,444,333 A | 8/1995 | Lau |
| 5,453,667 A | 9/1995 | Matsuda |
| 5,483,127 A | 1/1996 | Widmayer |
| 5,608,296 A | 3/1997 | Brown |
| 5,615,093 A | 3/1997 | Nalbant |
| 5,615,100 A | 3/1997 | Radecker |
| 5,623,187 A | 4/1997 | Caldiera |
| 5,631,523 A | 5/1997 | Rothenbuhler |
| 5,708,330 A | 1/1998 | Rothenbuhler |
| 5,736,817 A | 4/1998 | Rothenbuhler |
| 5,751,120 A | 5/1998 | Zeitler |
| 5,801,494 A | 9/1998 | Herres |
| 5,806,055 A | 9/1998 | Zinda |
| 5,825,138 A | 10/1998 | Diazzi |
| 5,886,481 A | 3/1999 | Flory |
| 5,914,571 A | 6/1999 | Beasley |
| 5,917,287 A | 6/1999 | Haederle |
| 5,936,358 A | 8/1999 | Okamoto |
| 5,945,784 A | 8/1999 | Mattas |
| 5,945,787 A | 8/1999 | Gorille |
| 5,949,192 A | 9/1999 | Kominami |
| 5,955,843 A | 9/1999 | Nuckolls |
| 5,962,985 A | 10/1999 | Buij |
| 5,962,987 A | 10/1999 | Statnic |
| 5,982,108 A | 11/1999 | Buij |
| 5,986,412 A | 11/1999 | Collins |
| 5,990,599 A | 11/1999 | Jackson |
| 5,990,634 A | 11/1999 | Brown |
| 5,994,846 A | 11/1999 | Blankers |
| 6,011,360 A | 1/2000 | Gradziki |
| 6,020,691 A | 2/2000 | Sun |
| 6,028,397 A | 2/2000 | Blankers |
| 6,031,340 A | 2/2000 | Brosius |
| 6,075,326 A | 6/2000 | Nostwick |
| 6,091,208 A | 7/2000 | Flory |
| 6,100,649 A | 8/2000 | Shoshan et al. |
| 6,100,652 A | 8/2000 | Konopka |
| 6,111,359 A | 8/2000 | Work et al. |
| 6,114,814 A | 9/2000 | Shannon |
| 6,144,171 A | 11/2000 | Clements |
| 6,144,172 A | 11/2000 | Sun |
| 6,157,142 A | 12/2000 | Moisin |
| 6,160,362 A | 12/2000 | Shone |
| 6,181,076 B1 | 1/2001 | Trestman |
| 6,188,180 B1 | 2/2001 | Diamond |
| 6,194,845 B1 | 2/2001 | Konopka |
| 6,239,559 B1 | 5/2001 | Okamoto |
| 6,259,215 B1 | 7/2001 | Roman |
| 6,259,615 B1 | 7/2001 | Lin |
| 6,294,880 B1 | 9/2001 | Deurloo |
| 6,304,041 B1 | 10/2001 | Farkas |
| 6,316,881 B1 | 11/2001 | Shannon |
| 6,316,885 B1 | 11/2001 | Collins |
| 6,316,887 B1 | 11/2001 | Ribarich |
| 6,329,761 B1 | 12/2001 | Melis |
| 6,344,717 B1 | 2/2002 | Lestician |
| 6,359,393 B1 | 3/2002 | Brown |
| 6,359,394 B1 | 3/2002 | Stein |
| 6,369,518 B1 | 4/2002 | Kelly |
| 6,369,526 B1 | 4/2002 | Pogadaev |
| 6,373,199 B1 | 4/2002 | Erhardt |
| 6,376,999 B1 | 4/2002 | Li |
| 6,380,694 B1 | 4/2002 | Uchihashi et al. |
| 6,392,365 B1 | 5/2002 | Zhou et al. |
| 6,396,722 B2 | 5/2002 | Lin |
| 6,417,625 B1 | 7/2002 | Brooks |
| 6,429,597 B1 | 8/2002 | Flory |
| 6,437,515 B1 | 8/2002 | Kamoi et al. |
| 6,448,720 B1 | 9/2002 | Sun |
| 6,483,257 B1 | 11/2002 | Henderson |
| 6,498,437 B1 | 12/2002 | Chang |
| 6,504,313 B1 | 1/2003 | Shen |
| 6,518,712 B2 * | 2/2003 | Weng ........................ 315/209 R |
| 6,525,491 B2 | 2/2003 | Huber |
| 6,555,972 B1 | 4/2003 | Lestician |
| 6,593,703 B2 | 7/2003 | Sun |
| 6,597,128 B2 | 7/2003 | Flory |
| 6,608,450 B2 | 8/2003 | Lestician |
| 6,608,451 B2 | 8/2003 | Collins |
| 6,628,090 B1 | 9/2003 | Scollo |
| 6,633,138 B2 | 10/2003 | Shannon |
| 6,642,673 B2 | 11/2003 | Hudson |
| 6,650,067 B1 | 11/2003 | Shloush |
| 6,664,790 B2 | 12/2003 | Cook |
| 6,667,587 B1 | 12/2003 | Chang |
| 6,683,422 B1 | 1/2004 | Moyer |
| 6,696,803 B2 | 2/2004 | Tao |
| 6,707,263 B1 | 3/2004 | Prasad |
| 6,734,637 B2 | 5/2004 | Ellams |
| 6,756,747 B2 | 6/2004 | Hsieh |
| 6,781,327 B2 | 8/2004 | Ohsawa |
| 6,804,129 B2 | 10/2004 | Lin |
| 6,822,401 B2 | 11/2004 | Borella |
| 6,965,204 B2 * | 11/2005 | Langeslag ................. 315/209 R |
| 7,110,267 B2 * | 9/2006 | Lurkens ..................... 363/21.02 |
| 7,486,028 B2 * | 2/2009 | Langeslag et al. ........ 315/209 R |
| 2001/0030515 A1 | 10/2001 | Huber |
| 2002/0047547 A1 | 4/2002 | Flory |
| 2002/0047609 A1 | 4/2002 | Weng |
| 2002/0074952 A1 | 6/2002 | Hudson |
| 2002/0121866 A1 | 9/2002 | Ellams |
| 2002/0140370 A1 | 10/2002 | Sun |
| 2002/0145393 A1 | 10/2002 | Hui |
| 2002/0167281 A1 | 11/2002 | Buij |
| 2002/0171376 A1 | 11/2002 | Rust |
| 2002/0180383 A1 | 12/2002 | Gong |
| 2002/0190665 A1 | 12/2002 | Sun |
| 2003/0006720 A1 | 1/2003 | Borella |
| 2003/0038602 A1 | 2/2003 | Lestician |
| 2003/0062853 A1 | 4/2003 | Flory |
| 2003/0080694 A1 | 5/2003 | Collins |
| 2003/0137257 A1 | 7/2003 | Collins |
| 2003/0137260 A1 | 7/2003 | Ohsawa |
| 2003/0161164 A1 | 8/2003 | Shannon |
| 2003/0222586 A1 | 12/2003 | Brooks |
| 2004/0061454 A1 | 4/2004 | Prasad |
| 2004/0095076 A1 | 5/2004 | Kastle |
| 2004/0113570 A1 | 6/2004 | Ribavich |
| 2004/0130374 A1 | 7/2004 | Dulaney |
| 2004/0155607 A1 | 8/2004 | Rust |
| 2004/0183463 A1 | 9/2004 | Sun et al. |
| 2004/0207335 A1 | 10/2004 | Nerone |
| 2004/0257002 A1 | 12/2004 | Gerardus |
| 2004/0257004 A1 | 12/2004 | Deurloo |

FOREIGN PATENT DOCUMENTS

| | | |
|---|---|---|
| EP | 0253163 A2 | 1/1988 |
| EP | 0291223 A1 | 5/1988 |
| EP | 0314077 A2 | 10/1988 |
| EP | 0383385 A1 | 8/1990 |
| EP | 0536535 A1 | 3/1992 |
| EP | 0577105 A1 | 6/1993 |
| EP | 0566310 A1 | 10/1993 |
| EP | 0566815 A | 10/1993 |
| EP | 0664663 A1 | 1/1994 |
| EP | 0595414 A2 | 5/1994 |
| EP | 0613326 A1 | 8/1994 |
| EP | 0638918 A1 | 2/1995 |
| EP | 0650313 A2 | 4/1995 |
| EP | 0719591 A2 | 7/1996 |
| EP | 0766499 A1 | 4/1997 |
| EP | 0831517 A2 | 3/1998 |
| EP | 0868115 A2 | 9/1998 |
| EP | 0975204 A1 | 1/2000 |
| EP | 1077591 A2 | 2/2001 |
| EP | 1239708 | 3/2002 |
| EP | 1206169 A2 | 5/2002 |
| EP | 1225791 A2 | 7/2002 |
| EP | 1227706 A2 | 7/2002 |
| EP | 1367864 A | 12/2003 |
| EP | 1404163 A2 | 3/2004 |
| EP | 1379112 A1 | 7/2004 |
| EP | 1427263 A1 | 9/2004 |
| JP | 01251597 A | 6/1989 |
| JP | 4292898 A | 10/1992 |
| JP | 4292899 A | 10/1992 |
| JP | 04308691 A | 10/1992 |
| JP | 05047484 A | 2/1993 |
| JP | 05290988 A | 5/1993 |
| JP | 6029006 A | 2/1994 |
| JP | 06132087 A | 5/1994 |
| JP | 70006888 A | 1/1995 |
| JP | 08273856 A | 10/1996 |
| JP | 10270188 | 10/1998 |
| JP | 200012251 A | 1/2000 |
| JP | 2002260886 | 9/2002 |
| JP | 2002373511 | 12/2002 |
| JP | 200317284 A | 1/2003 |
| JP | 2003163093 | 6/2003 |
| JP | 2003187996 A1 | 7/2003 |
| WO | 83/02537 A1 | 7/1983 |
| WO | 93/14559 A | 7/1993 |
| WO | 95/01712 A1 | 1/1995 |
| WO | 9604770 A1 | 2/1996 |
| WO | 96/20578 A2 | 7/1996 |
| WO | 96/25022 A1 | 8/1996 |
| WO | 97/11580 A1 | 3/1997 |
| WO | 97/11583 A1 | 3/1997 |
| WO | 97/11585 A1 | 3/1997 |
| WO | 97/11586 A1 | 3/1997 |
| WO | 97/38561 A1 | 10/1997 |
| WO | 97/42795 A1 | 11/1997 |
| WO | 98/07301 A1 | 2/1998 |
| WO | 98/28836 A1 | 7/1998 |
| WO | 98/51133 A2 | 11/1998 |
| WO | 99/05735 A1 | 2/1999 |
| WO | 99/30538 | 6/1999 |
| WO | 99/30538 A1 | 6/1999 |
| WO | 99/40757 A1 | 8/1999 |
| WO | 00/22889 A2 | 9/1999 |
| WO | 00/21341 A1 | 4/2000 |
| WO | 00/59268 A1 | 10/2000 |
| WO | 00/69224 A1 | 11/2000 |
| WO | 01/33916 A1 | 5/2001 |
| WO | 01/47325 A1 | 6/2001 |
| WO | 02/13222 A1 | 2/2002 |
| WO | 02/23958 A | 3/2002 |
| WO | 02/23959 A1 | 3/2002 |
| WO | 02/28152 A1 | 4/2002 |
| WO | 02/32194 A2 | 4/2002 |
| WO | 02/49399 A1 | 6/2002 |
| WO | 02/060228 A1 | 8/2002 |
| WO | 02/080630 | 10/2002 |
| WO | 02/087290 A1 | 10/2002 |
| WO | 02/104083 | 12/2002 |
| WO | 03/037043 A1 | 5/2003 |
| WO | 03/058590 A1 | 7/2003 |
| WO | 03/058591 A1 | 7/2003 |
| WO | 03/060619 A1 | 7/2003 |
| WO | 03/098978 A1 | 11/2003 |
| WO | 2004/008814 A1 | 1/2004 |
| WO | 2004/010743 A1 | 1/2004 |
| WO | 2006/100661 A1 | 9/2006 |

* cited by examiner

IGNITER CIRCUIT FOR AN HID LAMP

FIELD OF THE INVENTION

This invention relates to igniters for high intensity discharge lamps.

BACKGROUND OF THE INVENTION

The function of a high-intensity discharge (HID) electronic ballast is to supply ignition to the lamp for starting and then operating the lamp, such as a metal halide lamp. A metal halide lamp is a gas discharge lamp in which metal halides are enclosed, for example, in a quartz envelope.

To initiate its operation, a metal halide lamp demands a high ignition voltage. Once the lamp is ignited, the voltages falls to low voltage of the order of 20 V and the lamp it is then maintained for a short time (typically between 1-2 minutes) in so-called "current mode" where the current is constant and the voltage rises until the lamp reaches nominal power, whereafter the ballast serves to stabilize the power.

Prior art igniter circuits are known where an uncontrolled oscillator frequency is swept from a frequency that is less than the resonant frequency such that when it reaches resonance the voltage reaches maximum value and the lamp strikes. However, during this operation the frequency continues to rise and the voltage therefore falls.

SUMMARY OF THE INVENTION

It is an object of the invention to provide an igniter circuit for an HID lamp that employs a self-oscillating power supply for applying across the lamp a high ignition voltage that increases with time.

It is a further object to provide such an igniter circuit that is configured for coupling directly to an inverter having a half bridge topology for feeding low frequency current to the lamp after ignition.

These objects are realized in accordance with a first aspect of the invention by an igniter circuit for an HID lamp, the igniter circuit comprising:
    a DC input for coupling to a source of DC voltage,
    an output for coupling to the HID lamp, and
    a resonant ignition circuit operating at a controlled resonant frequency coupled to said DC input for producing successive bursts of voltage having a frequency equal to the resonant frequency and having an amplitude that increases with time and for feeding said bursts of voltage across the output of the igniter until an HID lamp coupled thereto reaches breakdown.

According to a second aspect of the invention, there is provided a method for igniting a HID lamp, the method comprising:
    using a resonant circuit connected across the lamp to generate successive bursts of voltage having a frequency equal to the resonant frequency and having an amplitude that increases with time; and
    applying said bursts of voltage across the HID lamp until the lamp ignites, thereby loading the resonant circuit so that its Q factor falls sufficiently to stop the resonant circuit resonating.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EXEMPLARY EMBODIMENTS

Figure 1:
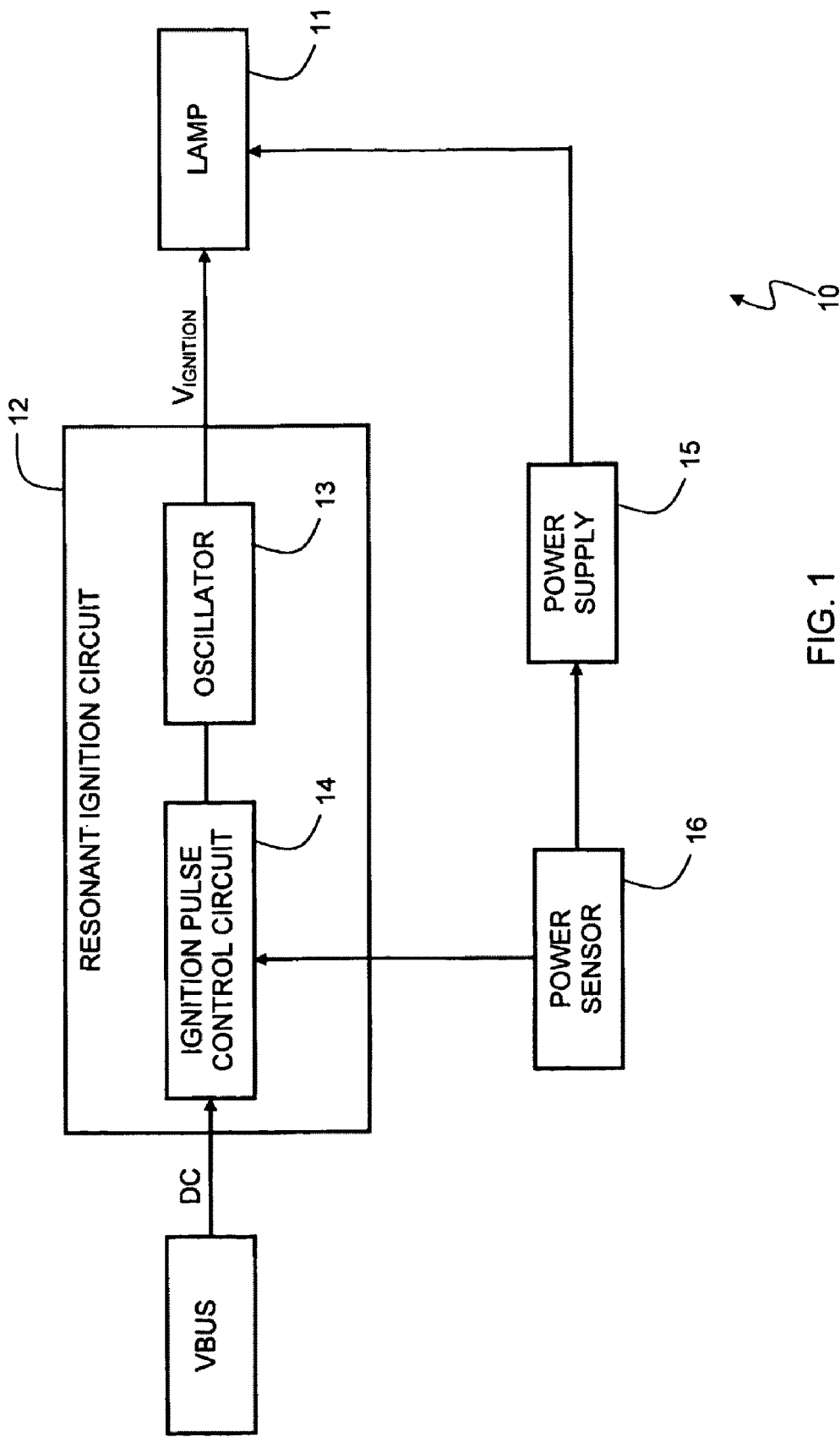
FIG. 1 is a block diagram showing the functionality of an igniter circuit for an HID lamp in accordance with an exemplary embodiment of the invention.

FIG. 1 is a block diagram showing the functionality of an igniter circuit 10 according to the invention for an HID lamp 11. The igniter circuit 10 is operated from a DC power source, VBUS, which is not itself part of the igniter circuit 10 and may be generated in manner well known to those skilled in the art. The DC power source, VBUS, is fed to a controlled self-oscillator 12 comprising a self oscillator 13 controlled by an ignition pulse control circuit 14. The HID lamp 11 is coupled to the controlled self-oscillator 12 which constitutes an igniter circuit for igniting the lamp. The lamp is powered by a power supply 15, which conveniently is coupled to the DC power source, VBUS, although it could be independent thereof. In order to disable operation of the igniter circuit after ignition of the HID lamp 11, a power sensor 16 is responsively coupled to the DC power source, VBUS, so as to sense the current supplied thereby. Before the lamp 11 ignites the current sensed by the power sensor 16 is low; but once the lamp 11 ignites it draws power from the DC power source, VBUS. The power sensor 16 thus serves to indicate whether or not the HID lamp 11 has ignited. The ignition pulse control circuit 14 is responsively coupled to the power sensor 16 so as to cease operation when the power sensor 16 senses that the HID lamp 11 has ignited. For the sake of completeness, although not relevant to the igniter circuit per se, the power sensor 16 serves a second function in that the power supply 15 includes a power regulator (not shown) that is responsive to the power sensed by the power sensor 16 for stabilizing the nominal power to the lamp 11.

Figure 2:
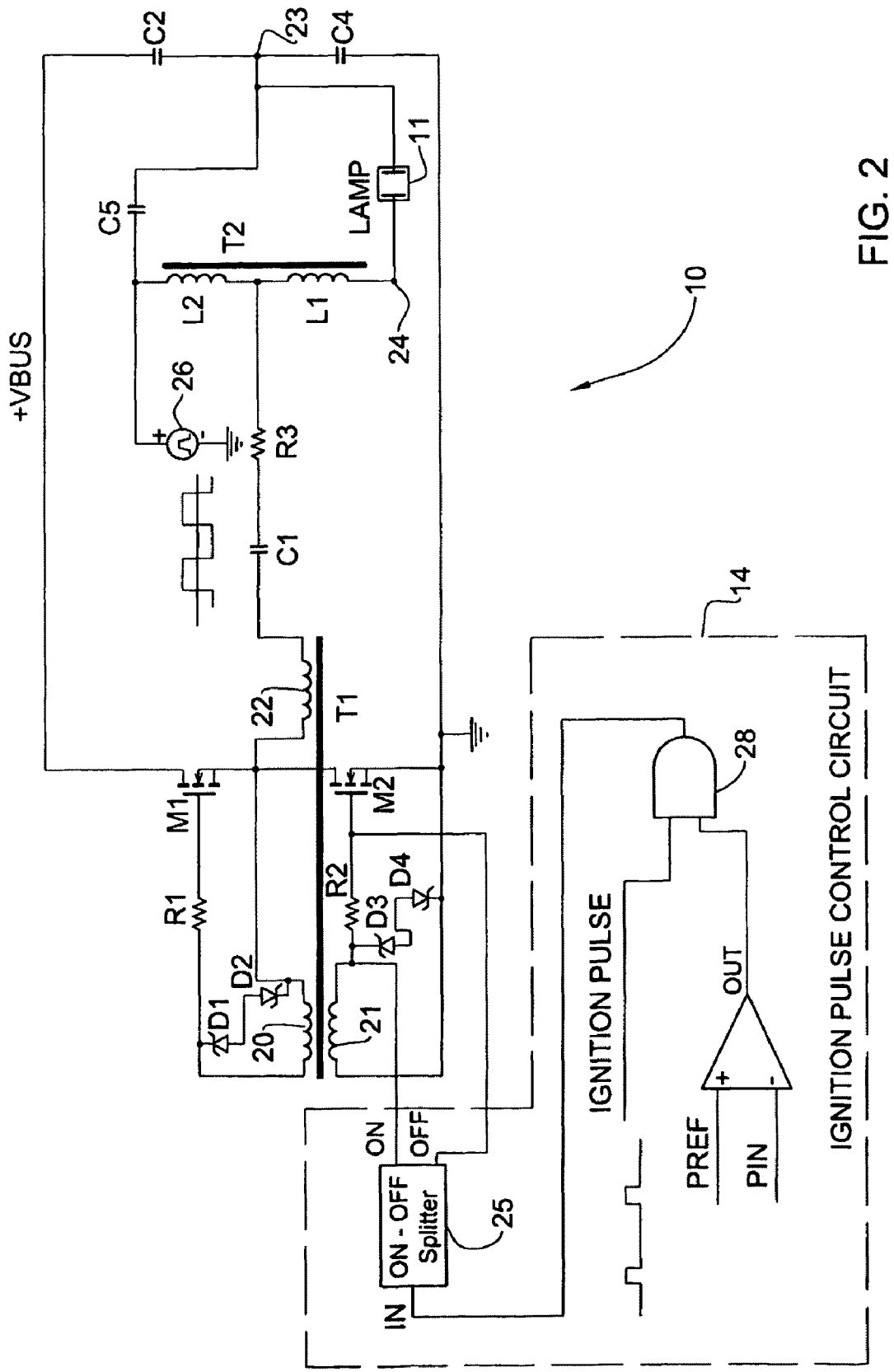
FIG. 2 is a schematic circuit diagram of the igniter circuit shown functionally in FIG. 1.

FIG. 2 is a schematic circuit diagram showing in detail a preferred embodiment of the igniter circuit 10 shown in FIG. 1.

Resonant Ignition Circuit

The oscillator 13 comprises a drive transformer T1 having first, second and third windings 20, 21 and 22, respectively, which are connected in the correct polarity for positive feedback (oscillation). A first end of the first winding 20 is coupled to the source terminal of a first MOSFET M1 whose gate terminal is coupled via a resistor R1 to a second end of the first winding 20. The drain terminal of the first MOSFET M1 is coupled to VBUS, typically having a voltage of 400 VDC. A pair of zener diodes D1 and D2 is coupled back to back across the first winding 20, their anodes being commonly connected and their respective cathodes being connected to opposite ends of the first winding 20. The zener diodes D1, D2, limit the gate voltage fed to the MOSFET M1 and thereby ensure that when the resonant voltage increases, it does not damage the gate of the MOSFET M1.

In complementary trimmer, the first end of the second winding 21 is coupled via a resistor R2 to the gate terminal of a second MOSFET M2 whose source terminal is coupled to a second end of the second winding 21 and constitutes the ground rail, GND. The drain terminal of the second MOSFET M2 is coupled to the source terminal of the first MOSFET M1. A pair of zener diodes D3 and D4 is coupled back to back across the first winding 20, their anodes being commonly connected and their respective cathodes being connected to opposite ends of the second winding 21. The zener diodes D3 and D4 limit the gate voltage fed to the MOSFET M2 and thereby ensure that when the resonant voltage increases, it does not damage the gate of the MOSFET M2. The first end of the second winding 21 is coupled to an 'ON' control output of an ON-OFF splitter 25, its second end being coupled to GND. An 'OFF' control output of the ON-OFF splitter 25 is connected to the gate of the MOSFET M2. An input of the ON-OFF splitter 25 is connected to an output of the ignition pulse control circuit 14, as will be described in more detail below. The ON-OFF splitter 25 serves to convey an ignition pulse conveyed by the ignition pulse control circuit 14 to the winding 21 of the drive transformer T1 to enable the oscillation process; and to convey a disable signal to the gate of the MOSFET M2 to prevent oscillation after the lamp 11 has ignited.

A first end of the third winding 22 of the oscillator drive transformer T1 is connected to a first capacitor C1 connected in series with a first end of a resistor R3, whose second end is coupled to the common junction of a split winding of a transformer T2, comprising windings L1, L2. The coils L1 and L2 are wound such that a first end of the coil L1 is connected to a second end 23 of the coil L2, whose first end is connected to a first end of the HID lamp 11. A second end of the third winding 22 is connected to the common junction of the two MOSFETs M1 and M2, i.e. to the source of M1 and to the drain of M2.

The DC power source, VBUS, comprises pair of large series connected electrolytic capacitors C2 and C4 connected between VBUS and GND, their common junction 24 being connected to a second end of the HID lamp 11 and to the second end of the coil L1 via a capacitor C5. The capacitors C2 and C4 serve as storage capacitors for storing DC voltage for powering the controlled self-oscillator 12 and the power supply 15. The power supply 15 operates as a low frequency square wave current source controlled power shown as 26 in FIG. 2 that is connected to the common junction of the coil L1 and the capacitor C5. The low frequency square wave current source is produced in known manner by an inverter (not shown). Preferably, the inverter is a half-bridge topology of which the capacitors C2 and C4 are integral components. The junction of the capacitors C2 and C4 and the first end of the coil L2 constitute output terminals of the igniter circuit 10 across which the HID lamp 11 is coupled.

Having described the topology of the resonant ignition circuit 12, its operation will now be described.

The resonant ignition circuit is constituted by M1 and M2, R1, R2, D1, D2, D3, D4, T1, C1, R3, L1, C4 (short), C5 (short) and its resonant frequency $f_0$ is determined by C1, L1 in accordance with the equation:

$$f_0 = \frac{1}{2\pi\sqrt{L1 \cdot C1}}$$

C4 and C5 have very low impedance at the resonant frequency and so practically behave as short circuits. The Q factor is determined by the values of R1, R2, R3. The resistors R1 and R2 together with the input capacitances of the gates of the two MOSFETs M1 and M2 create a phase shift which causes a reduction in the resonant voltage fed to the lamp.

The Q factor determines the maximum peak voltage that may be fed to the HID lamp 11 before breakdown, which may be several kilovolts, whereafter the voltage fed to the lamp falls to a low voltage, typically in the order of 20V and is maintained at constant current until it reaches the nominal power of the lamp.

Figure 3:
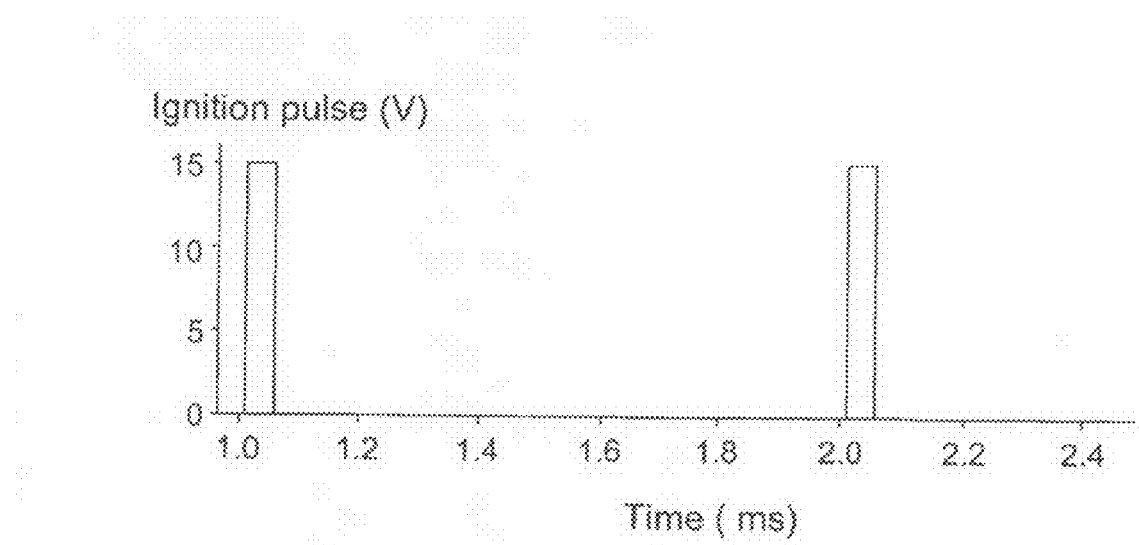
FIG. 3 is a waveform showing graphically a series of ignition pulses fed to the with the igniter circuit shown in FIG. 2.
Figure 4:
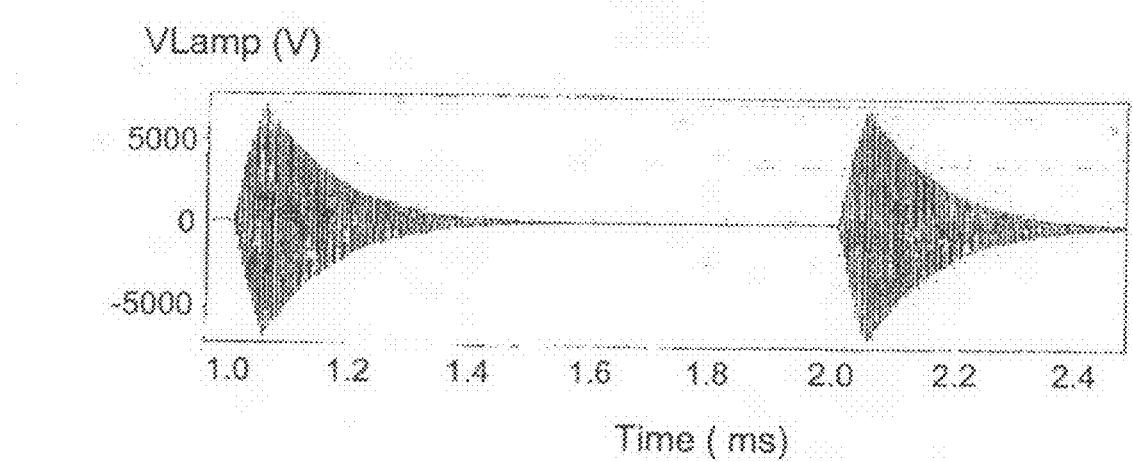
FIG. 4 is a waveform showing graphically a resonant frequency voltage whose amplitude increases with time and that is applied to the HID lamp prior to ignition.

A train of ignition pulses shown graphically in FIG. 3 at the resonant frequency $f_0$ is fed to the junction between the source of M1 and the drain of M2 through the resonant circuit constituted by C1 and L1, so that the resonant circuit resonates with increasing amplitude for the duration of each ignition pulse as shown graphically in FIG. 4 due to the positive feedback produced by the windings of the drive transformer, T1. At the end of each ignition pulse, the amplitude of the resonant lamp voltage decreases until it reaches substantially zero until the arrival of the next ignition pulse, when the cycle is repeated. As noted, C4 has low impedance at the resonant frequency and acts as a short circuit.

When the lamp 11 starts to conduct, the lamp acts as a low impedance, and the current through the lamp fed by the low frequency current source 26 (corresponding to the power supply 15 shown in FIG. 1) flows through L1 and L2 which together operate as a choke, which filters some of the high frequency ripple. C5 acts as a first filter for removing the high frequency ripple superimposed on the low frequency current. C2 and C4 whose mid-point voltage is equal to half VBUS form part of a half bridge inverter that serves to supply low frequency current to the lamp 11 after ignition; and are thus integral components of the power supply shown as 15 in FIG. 1 and of the low frequency current source shown as 26 in FIG. 2.

Before lamp breakdown, the transformer T2 serves as the lamp igniter; and after breakdown when the lamp starts to conduct in the current mode, it serves as a choke for removing the high frequency ripple.

The object is to generate a high voltage waveform with increasing amplitude that is applied to the lamp as shown graphically in FIG. 4. When the lamp voltage reaches a certain voltage (1 kV-4 kV depending on lamp temperature), the lamp ignites. When this happens, the lamp impedance falls to a low value and loads the resonant circuit so that its Q factor falls significantly and it stops resonating. The self-oscillation circuit stops the oscillator coil T1 from oscillating.

Ignition Pulse Control Circuit

As noted above, the oscillator 13 stops oscillating when the HID lamp 11 ignites owing to the fact that the low lamp impedance after ignition loads the resonant circuit causing a marked reduction in its Q factor. However, rather than rely on this alone, it is considered preferable to disable the ignition circuit once the lamp has ignited, this being achieved by the igniter pulse control circuit 14. The igniter pulse control circuit 14 comprises a comparator 27 having a positive input to which a reference voltage signal PREF is fed and having a negative input coupled to the power sensor 16 so as to receive a voltage signal PIN that is proportional to the power across the HID lamp 11. Ignition pulses shown graphically in FIG. 3 having a duty cycle determined by $T_{ON}$ and $T_{OFF}$ are fed to one input of a 2-input AND-gate 28 while the logic signal at the output of the comparator is fed to the second input of the AND-gate 28. Before the lamp starts conducting, PIN is low and the comparator output is logic HIGH; the AND-gate 28 therefore conveys the ignition pulses to the ON-OFF splitter 25. When the lamp ignites, PIN is larger than PREF and the output of the comparator 27 goes to LOW, whereupon the AND-gate 28 stops feeding the ignition pulses to the ON-OFF splitter 25.

The oscillator 13 is self-controlled to operate at the resonant frequency as determined by C1 and L1 such that although differences in the values of C1 and L1, as may occur in mass production owing to component tolerances will give rise to different resonant frequencies, the oscillator 13 will always operate at resonant frequency.

Moreover, the resonant frequency at which the oscillator 13 resonates is also a function of the parasitic capacitance of the wires connecting the HID lamp 11 to the resonant ignition circuit 12, being a function of their length. Therefore, the oscillator 13 resonates at resonant frequency regardless of the length of the wires connecting the HID lamp 11 to the resonant ignition circuit 12.

The invention claimed is:

1. An igniter circuit for an HID lamp, the igniter circuit comprising:
   a DC input for coupling to a source of DC voltage,
   an output for coupling to the HID lamp,
   a resonant ignition circuit including:
      an oscillator operating at a self-oscillating resonant frequency coupled to said DC input for producing successive bursts of voltage having a frequency equal to the resonant frequency and having an amplitude that increases with time and for feeding said bursts of voltage across the output of the igniter until an HID lamp coupled thereto reaches breakdown, so as to cause the lamp impedance to fall to a low value and load the resonant circuit so that its Q factor falls significantly and stops resonating thereby stopping the oscillator from oscillating;
      a current source having a low frequency component and high frequency component;
      a transformer comprising a first coil and a second coil connected in series with each other, the second coil being connected in series with the lamp, the first coil being part of the oscillator prior to ignition and, after ignition, serving to block the high frequency component so as to pass the low frequency component to the lamp; and
      a first capacitor having a first end coupled to the first coil and having a second end coupled to both the lamp and to a first end of a second capacitor having a second end connected to ground (GND), said first capacitor and second capacitor being configured for passing the high frequency component from the current source to GND.

2. The igniter circuit according to claim 1, wherein the input includes a pair of storage capacitors that are adapted to store high voltage DC, one of said storage capacitors being constituted by the second capacitor.

3. The igniter circuit according to claim 2, wherein the pair of storage capacitors serve to connect directly to respective outputs of a half-wave bridge rectifier.

4. The igniter circuit according to claim 3, wherein said storage capacitors are integral components of an inverter having a half-bridge topology.

5. The igniter circuit according to claims 1, wherein the ignition pulse control circuit is coupled to a sensor responsive to a function of power across the HID lamp for disabling the high voltage oscillator circuit upon ignition of the HID lamp.

6. The igniter circuit according to claim 1, wherein the oscillator comprises:
   a drive transformer having a first winding, a second winding and a third winding connected for producing positive feedback,
   a first end of the first winding being coupled to the source terminal of a first MOSFET whose gate terminal is coupled via a resistor to a second end of the first winding,
   the drain terminal of the first MOSFET being coupled to the DC input,
   the first end of the second winding being coupled via a resistor to the gate terminal of a second MOSFET whose source terminal is coupled to a second end of the second winding and constitutes a ground rail,
   the drain terminal of the second MOSFET being coupled to the source terminal of the first MOSFET,
   the first end of the second winding being coupled to an ON control output of an ON-OFF splitter that is adapted to convey an ignition pulse conveyed by the ignition pulse control circuit to the second winding of the drive transformer to enable oscillation; and to convey a disable signal to the gate of the second MOSFET to prevent oscillation after the lamp has ignited,
   a second end of the second winding being coupled to GND,
   an OFF control output of the ON-OFF splitter being connected to the gate of the second MOSFET,
   an input of the ON-OFF splitter being connected to an output of the ignition pulse control circuit,
   a first end of the third winding of the oscillator drive transformer being connected to a first capacitor connected in series with a first end of a resistor,
   a second end of the resistor being coupled to a common junction of a split winding of a transformer comprising a first coil and a second coil wound such that a first end of the first coil is connected to a second end of the second coil,
   a first end of the second coil being connected to a first end of the HID lamp, and
   a second end of the third winding being connected to the source of the first MOSFET and to the drain of the second MOSFET.

7. The igniter circuit according to claim 6, wherein the oscillator further comprises:
   a pair of zener diodes coupled back to back across the first winding, their anodes being commonly connected and their respective cathodes being connected to opposite ends of the first winding, and
   a pair of zener diodes coupled back to back across the first winding, their anodes being commonly connected and their respective cathodes being connected to opposite ends of the second winding.

8. A method for igniting a HID lamp, the method comprising:
   using a self-oscillating resonant circuit connected across the lamp to generate successive bursts of voltage having a frequency equal to the resonant frequency and having an amplitude that increases with time;
   applying said bursts of voltage across the HID lamp until the lamp ignites, thereby loading the resonant circuit so that its Q factor falls sufficiently to stop the resonant circuit self-resonating;
   providing a current source having a low frequency component and a high frequency component;
   feeding the current source to the lamp through a transformer having a first coil and a second coil connected in series with each other and the second coil being connected in series with the lamp;

prior to ignition, using the first coil as part of the oscillator for generating the resonant frequency; and after ignition, using the first coil as part of a choke for blocking the high frequency component so as to feed the low frequency component of the current source to the lamp for maintaining the lamp operative while filtering the high frequency component.

9. The method according to claim 8, further including substantially immediately disabling operation of the resonant circuit after lamp ignition.

10. An igniter circuit for an HID lamp, the igniter circuit comprising:

a DC input for coupling to a source of DC voltage, an output for coupling to the HID lamp, a resonant ignition circuit operating at a controlled resonant frequency coupled to said DC input for producing successive bursts of voltage having a frequency equal to the resonant frequency and having an amplitude that increases with time and for feeding said bursts of voltage across the output of the igniter until an HID lamp coupled thereto reaches breakdown;

wherein the resonant ignition circuit includes an oscillator controlled by an ignition pulse control circuit coupled thereto and the oscillator comprises:

a drive transformer having a first winding, a second winding and a third winding connected for producing positive feedback, a first end of the first winding being coupled to the source terminal of a first MOSFET whose gate terminal is coupled via a resistor to a second end of the first winding, the drain terminal of the first MOSFET being coupled to the DC input, the first end of the second winding being coupled via a resistor to the gate terminal of a second MOSFET whose source terminal is coupled to a second end of the second winding and constitutes a ground rail, the drain terminal of the second MOSFET being coupled to the source terminal of the first MOSFET, the first end of the second winding being coupled to an ON control output of an ON-OFF splitter that is adapted to convey an ignition pulse conveyed by the ignition pulse control circuit to the second winding of the drive transformer to enable oscillation; and to convey a disable signal to the gate of the second MOSFET to prevent oscillation after the lamp has ignited, a second end of the second winding being coupled to GND, an OFF control output of the ON-OFF splitter being connected to the gate of the second MOSFET, an input of the ON-OFF splitter being connected to an output of the ignition pulse control circuit, a first end of the third winding of the oscillator drive transformer being connected to a first capacitor connected in series with a first end of a resistor, a second end of the resistor being coupled to a common junction of a split winding of a transformer comprising a first coil and a second coil wound such that a first end of the first coil is connected to a second end of the second coil, a first end of the second coil being connected to a first end of the HID lamp, and a second end of the third winding being connected to the source of the first MOSFET and to the drain of the second MOSFET.

11. The igniter circuit according to claim 10, wherein the oscillator further comprises:

a pair of zener diodes coupled back to back across the first winding, their anodes being commonly connected and their respective cathodes being connected to opposite ends of the first winding, and a pair of zener diodes coupled back to back across the first winding, their anodes being commonly connected and their respective cathodes being connected to opposite ends of the second winding.

12. The igniter circuit according to claim 10, wherein the ignition pulse control circuit is coupled to a sensor responsive to a function of power across the HID lamp for disabling the high voltage oscillator circuit upon ignition of the HID lamp.

13. The igniter circuit according to claim 10, wherein the input includes a pair of storage capacitors that are adapted to store high voltage DC, one of said storage capacitors being constituted by the second capacitor.

14. The igniter circuit according to claim 13, wherein the pair of storage capacitors serve to connect directly to respective outputs of a half-wave bridge rectifier.

15. The igniter circuit according to claim 13, wherein said storage capacitors are integral components of an inverter having a half-bridge topology.

16. The igniter circuit according to claims 10, wherein the ignition pulse control circuit is coupled to a sensor responsive to a function of power across the HID lamp for disabling the high voltage oscillator circuit upon ignition of the HID lamp.

* * * * *